G. BRAUN.
TRACK CLEARER FOR MOWERS.
APPLICATION FILED FEB. 25, 1909.
925,863.
Patented June 22, 1909.
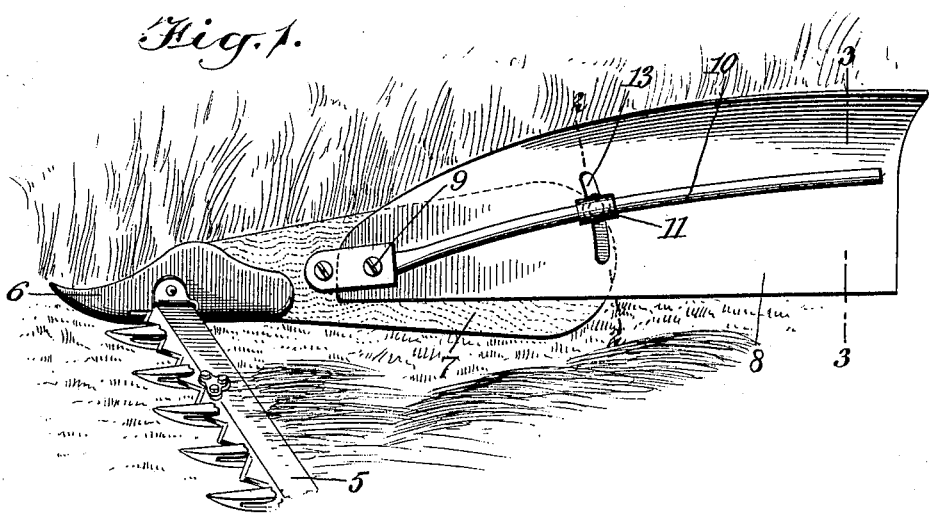
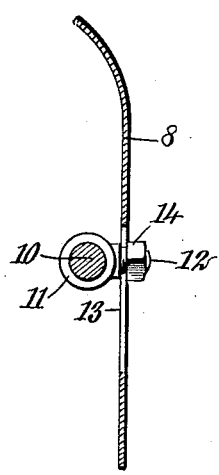
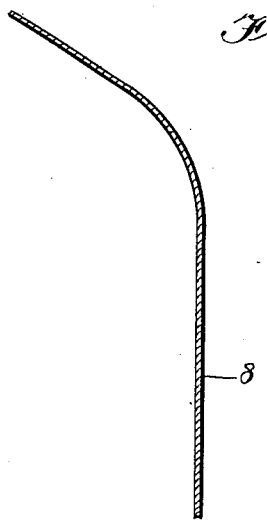
WITNESSES
INVENTOR
Gideon Braun
BY
ATTORNEYS

UNITED STATES PATENT OFFICE.

GIDEON BRAUN, OF DUNCAN, NEBRASKA.

TRACK-CLEARER FOR MOWERS.

No. 925,863.    Specification of Letters Patent.    Patented June 22, 1909.

Application filed February 25, 1909. Serial No. 479,907.

*To all whom it may concern:*

Be it known that I, GIDEON BRAUN, a citizen of the United States, and a resident of Duncan, in the county of Platte and State of Nebraska, have invented a new and Improved Track-Clearer for Mowers, of which the following is a full, clear, and exact description.

The invention is an improvement in track clearers for mowers, and has in view a device which will effectually throw the grass as it is cut from the standing grass, completely within the swath cut by the mower, and leave a space at the outer side of the swath clear of cut grass, in which the horse can walk and follow in the succeeding cut. To this end I provide in connection with the usual grass or butt-board of the mower an auxiliary clearing board or plate, the same increasing in width in passing from front to rear, with the top or upper portion of the board curved or bent inwardly and tapering in width rearwardly from a point at the front of the board. The auxiliary board is applied to the grass-board in a manner such that it may be easily secured and detached and may be adjusted vertically to adapt it to grass of different heights.

Reference is to be had to the accompanying drawings forming a part of this specification, in which similar characters of reference indicate corresponding parts in all the views.

Figure 1 is a perspective view of a fragment of a mower with my improvement applied thereto; Fig. 2 is a section on the line 2—2 of Fig. 1; and Fig. 3 is a section on the line 3—3 of Fig. 1.

For the purpose of illustrating the nature and application of my improvements I have shown the sickle-bar 5 of a mower having the attached shoe 6 at the end, and the customary grass or butt-board 7 secured to and extending rearwardly of the shoe.

The track-clearer board or plate 8 embodying my invention is in practice constructed of galvanized sheet metal and increases in width from front to rear, the bottom edge of the board being substantially straight, with the upper edge curving or inclining gradually upwardly and rearwardly. The top or upper portion of the board is bent or curved inwardly along a line substantially parallel to its bottom edge, thus making the inwardly-turned portion of increasing width in passing from front to rear. The forward portion of the clearer board 8 is substantially flat and is secured to the inner face of the grass-board at a point near the shoe 6, this connection being effected by a screw or bolt 9, which also passes through the dividing bar 10 of the mower, the latter being arranged at the inside of the board 8 and passing through a collar or sleeve 11 which as shown in Fig. 2 is provided at the side with an outwardly-projecting stud 12. This stud passes through an arcuate slot 13 intermediate the length of the board 8, and at its base the sleeve has a shoulder against which the inner face of the board bears, the board being clamped in adjusted position to the shoulder by a nut 14 threaded on the stud 12. With the board thus applied it is an easy matter to adjust it to various heights according to the length of the grass, or entirely remove it from the mower if desired.

The clearer board when in use engages the top of the cut grass, and by reason of the inwardly-turned portion of the board the grass is thrown well into the swath cut by the machine, leaving a space at the outer side of the swath clear, in which the horse can walk in the succeeding cut.

The attachment is obviously of special advantage in windy weather, as when the wind strikes the machine from the side or rear the grass is thrown against and falls over the grass-board, bearing down the uncut grass.

Having thus described my invention, I claim as new and desire to secure by Letters Patent:

1. In a mowing machine, a track-clearing board having the upper portion curving inwardly to throw the cut grass into the swath cut by the machine, with the inwardly-curved portion of the board increasing in width from front to rear.

2. In a mowing machine, a track-clearing board of increasing width from front to rear, with the upper portion of the board turned inwardly and increasing in width rearwardly from a point at the front.

3. In a mowing machine, a track-clearing board having the upper portion thereof turned inwardly and increasing in width rearwardly from a point at the front, to throw the cut grass into the swath cut by the machine, said board being adjustable to different elevations to adapt it to grass of different heights.

4. In a mowing machine, a grass-board, a track-clearing board pivotally supported at its forward end on the grass-board, a dividing rod, and means adjustably connecting the track-clearing board to the dividing rod.

5. In a mowing machine, a grass-board, a track-clearing board pivotally supported at its forward end on the grass-board and having an arcuate slot intermediate its length, a dividing rod, a member connected with the dividing rod having a stud projecting from the side thereof through said slot, with a shoulder at the base of the stud, and a nut threaded on the stud binding the track-clearing board to said shoulder.

In testimony whereof I have signed my name to this specification in the presence of two subscribing witnesses.

GIDEON BRAUN.

Witnesses:
G. W. PHILLIPS,
HECTOR BLASER.